(12) United States Patent
Heirman et al.

(10) Patent No.: US 12,000,312 B2
(45) Date of Patent: Jun. 4, 2024

(54) DEVICE FOR EXPANDING A FLUID

(71) Applicant: ATLAS COPCO AIRPOWER, NAAMLOZE VENNOOTSCHAP, Wilrijk (BE)

(72) Inventors: Peter Heirman, Wilrijk (BE); Erik Fabry, Wilrijk (BE); Anton Goethals, Wilrijk (BE); Henrik Öhman, Wilrijk (BE); Rasmus Rubycz, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 10 days.

(21) Appl. No.: 17/785,209

(22) PCT Filed: Nov. 16, 2020

(86) PCT No.: PCT/IB2020/060750
§ 371 (c)(1),
(2) Date: Jun. 14, 2022

(87) PCT Pub. No.: WO2021/123952
PCT Pub. Date: Jun. 24, 2021

(65) Prior Publication Data
US 2022/0397043 A1    Dec. 15, 2022

(30) Foreign Application Priority Data
Dec. 17, 2019    (BE) ................................ 2019/5919

(51) Int. Cl.
*F01K 27/02* (2006.01)
*F01D 15/10* (2006.01)
(Continued)

(52) U.S. Cl.
CPC .............. *F01K 27/02* (2013.01); *F01D 15/10* (2013.01); *F02C 1/10* (2013.01); *F02C 6/18* (2013.01);
(Continued)

(58) Field of Classification Search
CPC .......... F01K 27/02; F01D 15/10; F01D 25/08; F01D 25/12; F01D 25/125; F02C 1/10;
(Continued)

(56) References Cited

U.S. PATENT DOCUMENTS 4,191,021 A * 3/1980 Nakamura .............. F01K 25/08
60/671
7,047,744 B1    5/2006 Robertson et al.
(Continued)

FOREIGN PATENT DOCUMENTS

| EP | 1 643 085 A1 | 4/2006 |
|---|---|---|
| EP | 2 518 283 A2 | 10/2012 |
| FR | 2 341 738 A1 | 9/1977 |

OTHER PUBLICATIONS

International Search Report for PCT/IB2020/060750, dated Jan. 14, 2021.

*Primary Examiner* — Loren C Edwards
(74) *Attorney, Agent, or Firm* — Sughrue Mion, PLLC

(57) ABSTRACT

Device for expanding a fluid, wherein the device (1) is provided with an expander element (2) for expanding the fluid, a generator (3) and a transmission (4) between the two, characterized in that the generator (3) is a liquid-cooled generator and the expander element (2) is heated using liquid, wherein the device (1) is further provided with a common liquid circuit (8) for the generator (3) and the expander element (2), wherein the liquid circuit (8) comprises a liquid pump (10) which can pump up liquid from a liquid reservoir (11), wherein the liquid circuit (8) also comprises a liquid line (9) which runs from the liquid
(Continued)

Figure 1:
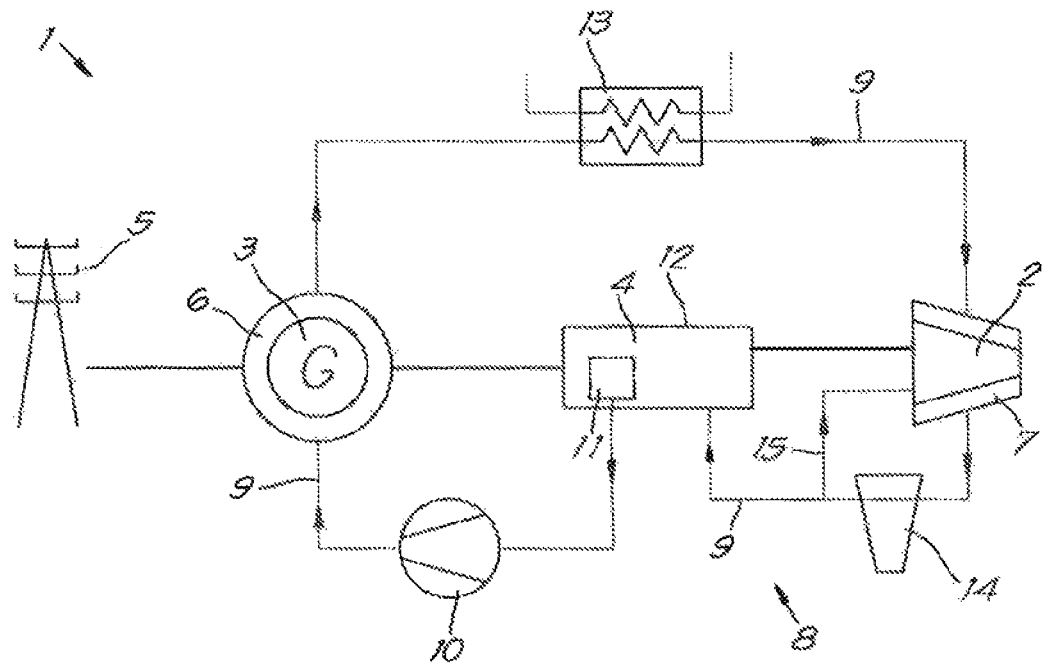

reservoir (11) and which incorporates the liquid pump (10), the generator (3) and the expander element (2).

17 Claims, 1 Drawing Sheet

(51) Int. Cl.
  *F02C 1/10* (2006.01)
  *F02C 6/18* (2006.01)
  *F04B 9/02* (2006.01)
  *F04B 23/02* (2006.01)

(52) U.S. Cl.
  CPC ............... *F04B 9/02* (2013.01); *F04B 23/02* (2013.01); *F05D 2220/60* (2013.01); *F05D 2220/76* (2013.01)

(58) Field of Classification Search
  CPC .... F02C 6/18; F04B 9/02; F04B 23/02; F05D 2220/60; F05D 2220/76
  See application file for complete search history.

(56) References Cited

U.S. PATENT DOCUMENTS

| | | | |
|---|---|---|---|
| 2005/0039433 A1* | 2/2005 | Nakano | F01D 25/125 60/39.08 |
| 2012/0235415 A1* | 9/2012 | Madison | F01K 25/10 60/671 |
| 2012/0240551 A1 | 9/2012 | Johnson | |
| 2013/0036736 A1 | 2/2013 | Hart et al. | |
| 2014/0075970 A1* | 3/2014 | Benson | F02C 1/05 62/238.7 |
| 2014/0225372 A1* | 8/2014 | Scheu | H02K 7/1823 290/54 |
| 2017/0059031 A1* | 3/2017 | Doertoluk | F03D 80/70 |

* cited by examiner

DEVICE FOR EXPANDING A FLUID

CROSS REFERENCE TO RELATED APPLICATIONS

This application is a National Stage of International Application No. PCT/IB2020/060750 filed Nov. 16, 2020, claiming priority based on Belgium Patent Application No. 2019/5919 filed Dec. 17, 2019.

The present invention relates to a device for expanding a fluid.

More specifically, the invention is intended for expanding gases such as air or natural gas or unsaturated, saturated or supersaturated vapor such as steam or a mixture using an expander element.

It is known that such expansion can generate electrical energy.

Traditionally, for this purpose a generator is used which is directly or indirectly driven by the expander, for example by means of a gear transmission, and thus can generate electrical energy.

It is known that losses occur during this process of mechanical energy conversion, which reduces the efficiency of the process.

It is also known that the expansion of a fluid is accompanied by a decrease in the enthalpy of the fluid and that, as a consequence, in many cases energy is needed to warm up the fluid before and/or during and/or after expansion.

In EP 2 518 283 A2, an expansion system is presented including a pump configured to pressurize a condensed working fluid received from a condenser. The expansion system further includes a heat exchanger coupled to the pump and configured to vaporize the condensed working fluid received from the pump. The expansion system also includes an expander coupled to the heat exchanger and configured to expand the vaporized working fluid flowing from an inlet side of the expander to an outlet side of the expander. In addition, the expansion system includes a generator coupled to the expander and configured to generate energy in response to the expansion of the vaporized working fluid. Further, the expansion system includes an integrated cooling unit (122) configured to convey at least a portion of the condensed working fluid from an inlet side of the generator (114) to an outlet side of the generator (114) to dissipate heat generated by the generator.

U.S. Pat. No. 7,047,744 B1 relates to a dynamic heat sink engine including a storage vessel having a working fluid outlet and a working fluid inlet. The lower portion of the storage vessel contains a cryogenic working fluid, such as liquid hydrogen, at a temperature at near its boiling point. The engine further includes a working fluid circuit extending between the working fluid outlet and the working fluid inlet of the storage vessel. The working fluid circuit includes the serial connection of the following components from the working fluid outlet to the working fluid inlet: a fluid pump; a vaporizer having a liquid line passing therethrough; a heater; an expansion engine having a rotary output shaft an electrical generator connected to the rotary output shaft of the expansion engine; a vapor line passing through the vaporizer, the vaporizer including a heat exchanger providing thermal communication between the liquid line and the vapor line.

EP 1 643 085 A1 describes a heating system for at least one consumer in a building including a combustion chamber (36), a boiler (12), a hot water feed and return connected to the boiler, and an air induction opening (48) to supply air to the combustion chamber for the burning of the gas or oil fuel. Hot gases pass through a gas turbine installation (29) is located between the air induction opening and the boiler. The gas turbine installation has at least one gas turbine (90) which is connected to an electric generator (34) for the delivery of electrical power. An independent claim is included for a modular unit for a heating system comprising at least one combustion chamber, a generator, and at least one gas turbine, which can be fastened to a boiler.

US 2012/240551 A2 relates to a heat engine for use in conjunction with a power generating plant, including a turbine section having a number of turbines, a heat exchanger section having a number of modules through which the expanded working fluid of the power generating plant and other sources of heat are circulated, a laminar flow inducing section, and a tower section for providing a pressure differential across the turbines of the turbine section. In use, the heat engine provides the dual function of: heating air to generate an updraft such that air forces its way into the turbine sections to drive the turbines and generate additional electricity; and using incoming colder air to condense the expanded working fluid and cool other sources of heat.

The purpose of the present invention is to provide a solution to at least one of said and/or other disadvantages, by providing for a device that allows the losses that occur during the mechanical energy conversion in the generator and possibly in the transmission to be recovered and used to heat the fluid.

For that purpose, the invention concerns a device for expanding a fluid, in which the device is provided with an expander element for expanding the fluid, a generator and a transmission between the two characterized in that the generator is a liquid-cooled generator and that the expander element is heated using a liquid, wherein the device is further provided with a common liquid circuit for the generator and the expander element, wherein the liquid circuit comprises a liquid pump which can pump up liquid from a liquid reservoir wherein the liquid circuit also comprises a liquid line which runs from the liquid reservoir and which incorporates the liquid pump, the generator and the expander element.

This has the advantage that by providing a common liquid circuit for the generator and the expander element, the expander element can be heated using the generated residual or loss heat of the generator.

In this way the heat losses are recovered and used to partly compensate for the enthalpy decrease of the expanding fluid in the expander element.

Another advantage is that application of a liquid-cooled generator rather than an air-cooled generator will reduce the size of the device.

In a preferred embodiment, the liquid is oil.

This has the advantage that in most cases an oil pump is already provided for lubrication of the bearings and gears in the generator, the transmission as well as the expander, so no additional oil pump is required.

The liquid line can first be routed from the liquid reservoir to the liquid pump and then to the generator and then to the expander element or the liquid line can first run from the liquid reservoir to the liquid pump and then to the expander element and then to the generator or the liquid line can be rerouted from the liquid reservoir first to the generator and then to the liquid pump and then to the expander element.

Preferably the transmission is incorporated in the liquid line.

The liquid line can then preferably run from the expander further to the transmission and then further to the liquid reservoir, the liquid pump or the generator. However, the transmission can be incorporated anywhere in the liquid circuit.

This is the preferred setup, but it is not excluded that the transmission is incorporated elsewhere in the liquid line.

Of course, the invention does not necessarily require the transmission to be included in the liquid circuit.

However, by including the transmission in the liquid circuit, the heat losses generated there can also be recovered.

Furthermore, it is not excluded that the liquid reservoir is integrated in, or is part of, the transmission.

In this case, the transmission is automatically incorporated in the liquid circuit, as it were.

In a practical embodiment aimed at further reducing the size of the device, the oil pump is driven by the generator shaft.

In another practical embodiment, also aimed at further reducing the size of the device, the oil pump is integrated in, or is part of, the transmission.

Figure 2:
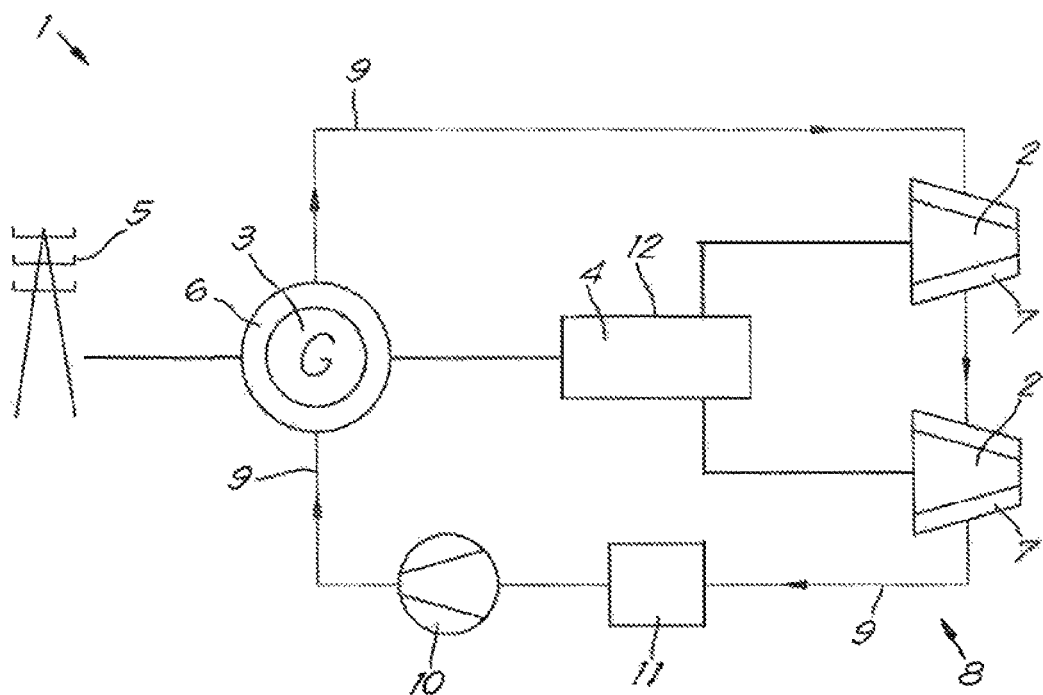

With to the intention of better demonstrating the characteristics of the invention, a number of preferred embodiments of a device based on the invention for expanding a fluid are described below, as an example without any restrictive character, with reference to the accompanying drawings wherein:

FIG. 1 schematically shows a device in accordance with the invention;

FIG. 2 shows an alternative embodiment of FIG. 1.

The device 1 according to the invention shown schematically in FIG. 1, essentially comprises an expander element 2 for expanding a fluid, a generator 3 and a transmission 4 between the two.

Preferably, but not necessary for the invention, the transmission 4 is a gear transmission. It is not excluded that the transmission 4 includes a flexible coupling or a chain transmission.

The generator 3 is connected to an electrical power grid 5 to which it will release its generated electrical energy.

The generator 3 is a liquid-cooled generator and for this purpose, in this case but not necessary for the invention, it is provided with a so-called liquid cooling jacket 6.

The expander element 2 is heated by liquid in order to compensate the temperature drop during the expansion process and, in this case but not necessary for the invention, for this purpose it is also provided with a liquid cooling jacket 7.

Said liquid is typically a liquid with lubricating properties. In this case, but not necessary for the invention, this liquid is oil.

Of course, the cooling jacket 6 of the generator 3 will ensure cooling of the generator 3 and the cooling jacket 7 of the expander element 2 will ensure cooling of the oil.

According to the invention, the device 1 is provided with a common liquid circuit 8, in this case an oil circuit, for the generator 3 and the expander element 2.

This liquid circuit 8 includes a liquid line 9.

This liquid line 9 is connected to the cooling jacket 6 respectively 7 of the generator 3 and the expander element 2, so oil can be sent through it.

The liquid circuit 8 includes a liquid pump 10 which can pump the liquid from a liquid reservoir 11, wherein said liquid duct 9 runs from the liquid pump 10 to the generator 6 and the expander element 2 and, in this case, subsequently back to the liquid reservoir 11.

The liquid pump 10 is shown in the illustrated example as an independent component of the device 1, but it is not excluded that the liquid pump 10 is driven by the shaft of the generator 3 or by the shaft of the expander element 2 or by a shaft in the transmission 4. This means that the liquid pump 10 is mounted on one of these shafts.

In such a case, it is an advantage that the liquid pump 10 is integrated in, or is part of, the generator 3, the expander element 2 or transmission 4.

In this case, the generator 3 is first incorporated in the liquid circuit 8 and subsequently in the expander element 2. The liquid circuit 8 will therefore send the pumped liquid to the generator 3 first and then to the expander element 2.

In this case, the liquid line 9 will continue from the expander element 2 to the transmission 4 and then back to the liquid reservoir 11.

This means the transmission 4 is also included in the liquid circuit 8, so the transmission 4 can be cooled and lubricated by the liquid.

In this case, but not necessary for the invention, the liquid reservoir 11 is integrated in the transmission 4.

For example, at the bottom of the housing 12 of the transmission 4, a kind of fluid reservoir 11 can be created where the fluid is collected.

This is shown schematically in the figure.

In this case, a heat exchanger 13 is installed in the liquid line 9. This heat exchanger 13 is optional.

In this case, the heat exchanger 13 is installed in the liquid line 9 downstream of the generator 3 and upstream of the expander element 2 or, in other words, between the generator 3 and the expander element 2. However, this heat exchanger 13 may basically be installed anywhere in the liquid circuit 8.

Finally, in this case, the liquid circuit 8 is provided with a liquid filter 14 and a branch line 15 for branching off part of the liquid, which branch line 15 runs from the liquid line 9 to the bearings of the expander element 2.

In this case, the branch line 15 is located downstream of the expander element 2 and the filter 14 is installed in the liquid line 9 between the expander element 2 and the branch line 15.

In this way, clean and cool liquid will be branched off to the bearings.

It is not excluded that the branch line 15 also goes to the bearings of the generator 3 or that a separate branch line 15 is provided for this purpose.

It is not excluded that the branch line 15 also goes to the bearings and gears of the transmission 4 or that a separate branch line 15 is provided for this purpose.

The operation of the device 1 is very simple and as follows.

In the known way, the expander element 2 will expand the fluid from a high pressure to a lower pressure and will hereby drive the generator 3 through the transmission 4.

The electric energy generated by this process will be delivered to the electrical power grid 5.

During operation, the liquid pump 10 will pump liquid, in this case oil, from the liquid reservoir 11, i.e. from the transmission 4 in this case, and send it to the generator 3 via the liquid line 9.

The oil will take up heat through the cooling jacket 6 of the generator 3, causing the generator 3 to cool down. In that way the loss heat or residual heat generated by the generator 3 is recovered by the oil.

The oil will then pass through the optional heat exchanger 13, where additional heating of the oil will occur.

The warm or hot oil will then end up in the cooling jacket 7 of the expander element 2 and will be cooled, or in other words, the expander element 2 will be heated using the residual heat of the generator 3.

The cold oil will leave the cooling jacket 7 and flow through the liquid line 9 to the oil filter 14.

Downstream of the oil filter 14, part of the cold, purified oil will be branched off through the branch line 15 and delivered to the bearings of the expander element 2.

After injection at the bearings, this oil is removed through the transmission 4 to the liquid reservoir 11 so the loss heat or residual heat of the transmission 4 can also be recovered.

The oil that has not been branched off will then end up in the liquid reservoir 11.

Subsequently, the liquid pump 10 will then pump up the oil again and the cycle starts again.

FIG. 2 shows a variant embodiment according to FIG. 1, whereby in this case two expander elements 2 are provided. Of course three, four or more expander elements 2 may also be provided.

These can be included in the liquid circuit 8 either in series or in parallel, or a combination of both. In the example of FIG. 2, they are included in series.

Note that this is not related to the expansion process. This means that the expanders 2 can expand fluid in series as well as in parallel, regardless of whether they are arranged in series or parallel in the liquid circuit 8.

In addition, in this case heat exchanger 13 is absent, as are filter 14 and branch line 15. It will be obvious that one or more of these components may be present.

Also, in this case, the liquid reservoir 11 is not integrated in the transmission 4 and the transmission 4 is not included in the liquid circuit 8.

Furthermore, the operation of the device 1 is equal to the operation of FIG. 1 as described above.

The present invention is by no means limited to the embodiments described as examples and shown in the figures, but a device according to the invention for expanding a fluid may be implemented in all kinds of shapes and sizes without going beyond the scope of the invention.

The invention claimed is:

1. A device for expanding a fluid,
wherein the device (1) is provided with an expander element (2) configured to expand the fluid, a generator (3) and a transmission (4) between the generator (3) and the expander element (2), wherein the generator (3) is a liquid-cooled generator and the expander element (2) is heated using a liquid with lubricating properties, the device (1) further being provided with a common liquid circuit (8) that provides the liquid to one of the generator (3) and the expander element (2) and then to another of the generator (3) and the expander element (2), wherein the generator (3), the transmission (4), and the expander element (2) are arranged in series along the common liquid circuit (8), wherein the liquid circuit (8) includes a liquid pump (10) which can pump up the liquid from a liquid reservoir (11), wherein the liquid circuit (8) also comprises a liquid line (9) which runs from the liquid reservoir (11) and which incorporates the liquid pump (10), the generator (3), the transmission, and the expander element (2).

2. The device according to claim 1, wherein the liquid line (9) runs from the liquid reservoir (11) first to the liquid pump (10) and subsequently to the generator (3) and then to the expander element (2) or that the liquid line (9) runs from the liquid reservoir (11) first to the liquid pump (10) and subsequently to the expander element (2) and then to the generator (3) or that the liquid line (9) runs from the liquid reservoir (11) first to the generator (3) and subsequently to the liquid pump (10) and then to the expander element (2).

3. The device according to claim 2, wherein a heat exchanger (13) is installed downstream of the generator (3) and upstream of the expander element (2).

4. The device according to claim 1, wherein a heat exchanger (13) is installed in the liquid line (9).

5. The device according to claim 1, wherein the liquid line (9) continues from the expander element (2) to the transmission (4) and subsequently further to the liquid reservoir (11), the liquid pump (10) or the generator (3).

6. The device according to claim 1, wherein the liquid in the liquid circuit is oil.

7. The device according to claim 6, wherein the liquid circuit (8) includes a branch line (15) for branching off oil, wherein the branch line (15) runs from the liquid line (9) to a bearing of the expander element (2) and/or a bearing of the generator (3).

8. The device according to claim 7, wherein an oil filter (14) is provided in the liquid circuit (8).

9. The device according to claim 8, wherein the branch line (15) is located downstream of the expander element (2) and the oil filter (14) is installed in the liquid line (9) between the expander element (2) and the branch line (15).

10. The device according to claim 1, wherein the liquid reservoir (11) is integrated in, or is part of, the transmission (4).

11. The device according to claim 1, wherein the liquid pump (10) is driven by a shaft of the generator (3).

12. The device according to claim 1, wherein the liquid pump (10) is integrated in, or is part of, the transmission (4).

13. The device according to claim 1, wherein the liquid pump (10) is integrated in, or is part of, the generator (3) or of the expander element (2).

14. The device according to claim 1, wherein the transmission (4) is a gear transmission.

15. The device according to claim 1, wherein the device (1) is provided with multiple expander elements (2), which are incorporated in series and/or in parallel in the liquid circuit (8).

16. The device according to claim 1, wherein the generator (3) and/or the expander element (2) are provided with a cooling jacket (6, 7) for the liquid, wherein the liquid line (9) is connected to the cooling jacket (6, 7).

17. The device according to claim 1, wherein, along the liquid line (9):
a first output of the liquid line (9) and from the generator (3) leads to the expander element (2) before returning to the generator (3) from the expander element (2), and
a second output of the liquid line (9) and from the expander element (2) leads to the generator (3) before returning to the expander element (2) from the generator (3).

* * * * *